Figure 1:
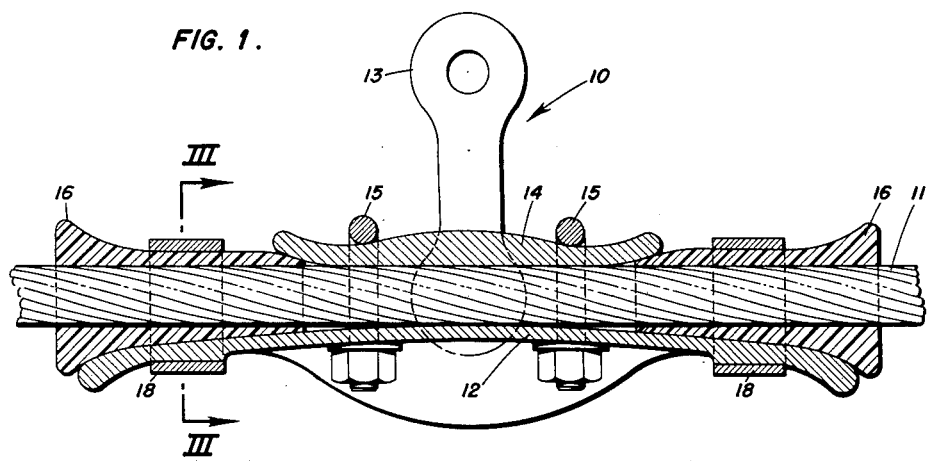

May 16, 1961 — A. DALMASSO — 2,984,441
SUSPENSION FOR AN ELECTRIC CABLE
Filed Sept. 22, 1958 — 2 Sheets-Sheet 1

AUGUSTE DALMASSO
INVENTOR.

BY Norman S. Blodgett
ATTORNEYS

May 16, 1961   A. DALMASSO   2,984,441
SUSPENSION FOR AN ELECTRIC CABLE
Filed Sept. 22, 1958   2 Sheets-Sheet 2

AUGUSTE DALMASSO
INVENTOR.

BY
Norman P. Blodgett
ATTORNEY

United States Patent Office 2,984,441
Patented May 16, 1961

2,984,441
SUSPENSION FOR AN ELECTRIC CABLE

Auguste Dalmasso, Paris, France, assignor to L'Aluminium Francais, Paris, France, a society of France Filed Sept. 22, 1958, Ser. No. 762,332

Claims priority, application France Mar. 18, 1958

1 Claim. (Cl. 248—63)

This invention relates to a suspension for an electric cable and more particularly to a supporting means for electric power lines capable of reducing destructive vibrations in the cable.

It is well known that overhead power lines or cables are subject to a catenary sagging between suspension points and that this sagging is associated with oscillations of the line. In the course of time metal fatigue takes place in the area of the suspensions due to these oscillations and this fatigue can result in the eventual breakage of the line. Heretofore, the devices which have been proposed have only partially diminished the problem of fatigue of overhead lines due to vibration. For instance, the use of a rubber sleeve inserted between the cable and the jaws of a clamp-type suspension device reduces the fatigue of the cable only by a small amount, but does not prevent the danger of breakage due to vibration. At the same time, a rapid deterioration of the rubber because of its compression against the cable serves to impair the ability of the suspension to fix the cable in place. These and other deficiencies in the prior art devices have been obviated in a novel manner by the present invention.

It is, therefore, an outstanding object of the present invention to provide a suspension for an electric cable which is capable of substantially reducing vibration and, therefore, fatigue in the cable.

Another object of this invention is the provision of a cable suspension which will reduce and suppress fatigue in overhead lines.

A still further object of the instant invention is the provision of a suspension for an electric cable which substantially reduces vibrations therein but which, at the same time, serves to immobilize the cable at its suspension point.

Another object of the invention is a cable suspension having vibration damping means, which means does not carry the weight of the cable and therefore is not subjected to deterioration because of excessive loading.

It is a still further object of this invention to provide a vibration-damping cable suspension which is inexpensive to manufacture and which is capable of a long life of useful service.

To the accomplishment of the foregoing and related ends, invention, then, comprises the features hereinafter fully described and particularly pointed out in the claim, the following description and the annexed drawings setting forth in detail certain illustrative embodiments of the invention, these being indicative, however, of but two of the various ways in which the principle of the invention may be employed.

Figure 2:
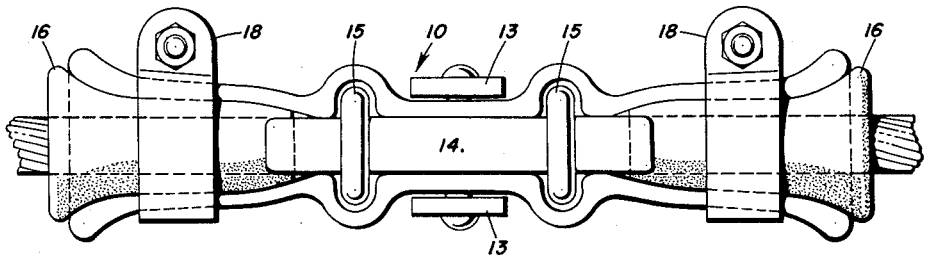
Figure 3:
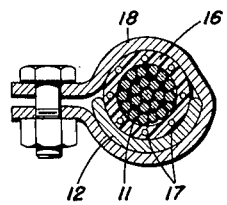
Figure 4:
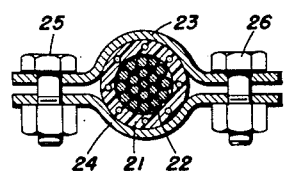
Figure 5:
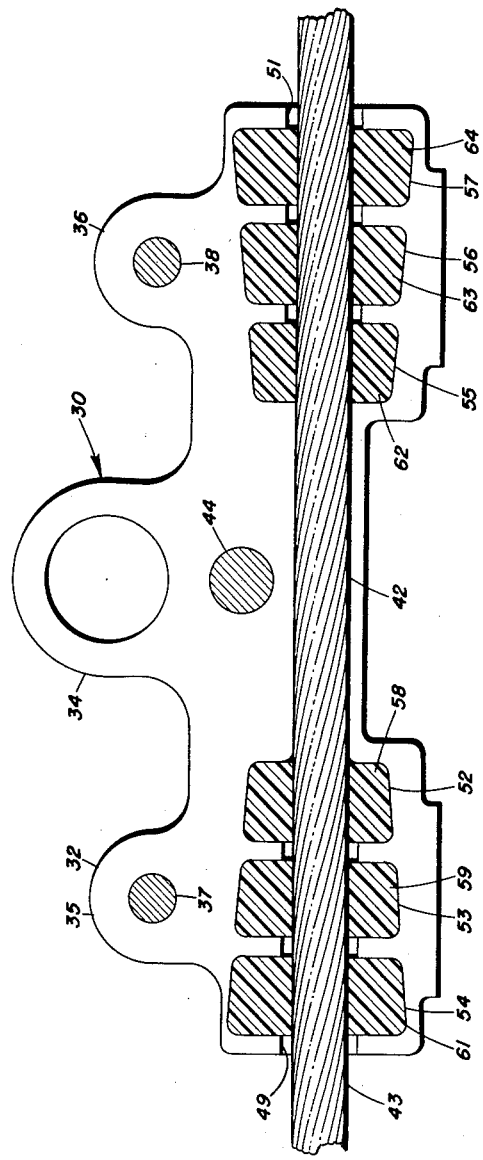
Figure 6:
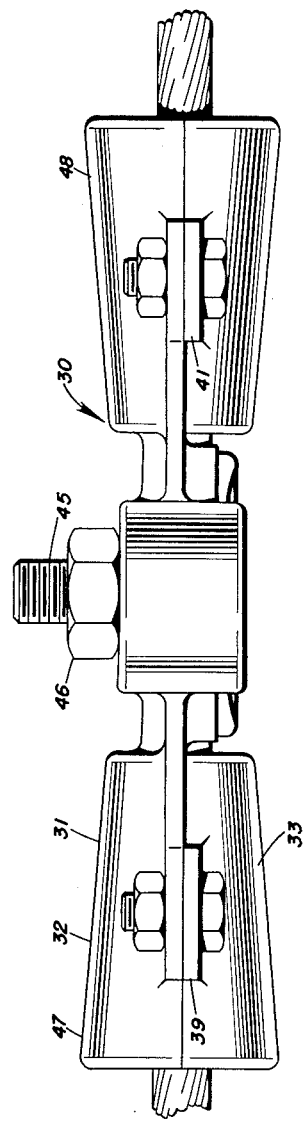

In the annexed drawings:

Fig. 1 is a vertical sectional view of a cable suspension embodying the principles of the present invention, Fig. 2 is a plan view of the suspension shown in Fig. 1, Fig. 3 is a sectional view of the suspension taken on the line III—III of Fig. 1, Fig. 4 is a sectional view of an apparatus constituting a variation of the invention, Fig. 5 is a vertical sectional view of another embodiment of the invention, and Fig. 6 is a plan view of the apparatus shown in Fig. 5.

Referring first to Figs. 1 and 2, wherein are best shown the general features of the invention, the cable suspension, indicated generally by the reference numeral 10, is shown in use with an electric cable 11. The suspension consists of a main body 12 provided with suspending arms 13 extending upwardly therefrom. The main body 12 is trough-like and is provided in its central portion with an upwardly-directed, semi-cylindrical portion in which lies the cable 11. Overlying this central portion is a clamping plate 14 which is forced downwardly on the cable 11 by U-bolts 15 whose legs extend downwardly through suitable opertures in the main body and are held in place by nuts on the underside of the body. At its ends the main body 12 is still trough-like, but, instead of having a semi-cylindrical trough which closely embraces the cable, is provided with a horn-like configuration which will be described with greater particularly hereinafter. Extending along the cable 11 in these end portions of the main body are vibration dampers 16, each of which is formed of a vibration damping material which, in the preferred embodiment, is formed of a resilient material, such as an elastomer or a plastic. Such polymeric materials may be used as butadiene-styrene, butadiene-acrylonitrile, chlorobutadiene, dimethylbutadiene, isobutylene, isoprene, and so on, known under the commercial designations of Buna, neoprene, GR–S, GR–M, GL–A, and so on.

Vibration dampers have an external form fitting closely ino the horn-like end of the main body. In general the shape of a damper is that of a horn, the wall thickness being a function of the distance from the clamping plate 14. In some cases, it may be preferable to make this a straight line relationship, but it is also possible to form it in the mathematical function demonstrated by the amplitude of vibration as one moves along the cable from the clamping point. This is usually an exponential function and, therefore, the exterior form of the vibration dampener will participate in this exponential shape. The inside bore of the vibration dampener 16 is such as to fit tightly around the cable 11. The vibration damper 16 is held in place in the main body by means of a clamping band 18 which is tightly held by means of a nut and bolt arrangement in the usual manner. As is evident in Fig. 3, each of the vibration dampers 16 is provided with longitudinally-arranged wires 17 which are embedded in the elastomer material.

The operation of the invention will now be readily understood in view of the above description. Let it be assumed that the cable 11 is suspended high in the air from a power line tower by means of the suspension arm 13. The wire is immovably fixed in the vicinity of the central portion of the main body 12 because of the clamping action of the clamping plate 14, which is tightly drawn down on the cable by means of the U-bolts 15. The wire sags into a mathematical catenary between similar supports and, as the wind blows, the cable is subjected to swinging and to vibrations. These vibrations move along the cable and are particularly noticeable in the vicinity of the suspension means. When vibrations start in the cable 11 associated with the present invention, the vibration dampers 16 maintain the displacement of the vibrations at a small value. The manner in which the elastomer resists the displacement of the cable by its resiliency is evident without difficulty, but it is also true that the vibrations are reduced by other means, which are not fully understood, involving internal molecular friction in the vibration damping material itself. In any case, the vibration damper 16 is formed so that the amount of resistance presented to the vibration increases with distance from the clamping plate 14 in such a manner that the area in which the greatest vibration is most likely to occur is presented with the greatest damping effect. By reducing the amount of vibration to a small amount the possibility of fatigue occurring close to the point of suspension is greatly minimized.

In Fig. 4 is shown a variation of the invention in which a vibration damper 21 is held in place on a cable 22 by means of opposed clamping saddles 23 and 24. The saddles are provided with matching ears which are held together and produce forces upon the vibration dampener 21 by means of bolts 25 and 26, suitably provided with nuts.

Figs. 5 and 6 show another variation of the invention. In this case, the suspension, indicated generally by the reference numeral 30, comprises a main body 31 which is divided into two halves 32 and 33, the main body portion 32 being provided with a suspension ring 34. The main body portion 32 is also provided with ears 35 and 36, provided, respectively, with apertures 37 and 38 located at the ends thereof. The main body portion 33 is also provided with ears 39 and 41 provided with apertures which match, respectively, with the apertures 37 and 38 of the ears 35 and 36. Suitable nuts and bolts are provided to pass through the ears and clamp the two halves of the main body 31 together. The main body portion 32 is provided with a semi-cylindrical central passage 42 adapted to fit tightly around an electric cable 43. The main body portion 33 is provided with a similar semi-cylindrical passage (not shown) which matches exactly with the passage 42 to form a circular cylindrical passage tightly embracing the cable and clamping it in place. To facilitate this clamping the central portion of the main body portion 32 is provided with an aperture 44 through which normally extends a stud 45 extending from the main body portion 33, there being a nut 46 extending over the stud and locking the two body portions in clamping relationship about the cable 43. The ends of the main body 31 are formed with frustro-conical end portions 47 and 48 through which pass bores 49 and 51, these bores being considerably larger than the bores defined by the passage 42 in the central portion thereof. Formed in the sides of the bore 39 are frustro-conical grooves 52, 53, and 54, the conical bottoms of these grooves lying on an imaginary frustro-conical surface having its larger end outward from the center of the main body in a manner similar to the outward form of the end 47 of the main body. In the same way the bore 51 is provided with similar frustro-conical grooves 55, 56 and 57. In each of the grooves 52, 53, 54, 55, 56 and 57 is situated a vibration damper 58, 59, 61, 62, 63, and 64, respectively. These vibration dampers are formed of one of the materials set forth in connection with the description of the vibration dampers 16 associated with the species of Fig. 1. The operation of this present embodiment of the invention will be quite clear from the above description. The cable 43 is clamped in the middle portion of the main body 32 and the vibrations are repressed by the various vibration dampers. Because the fact that the series of vibration dampers varies in direct relationship with the distance from the clamping point, it can be seen that the vibration damping is a straight-line function. It will be understood that this probably only approximates the degree of damping necessary, but in a practical case may be sufficient to reduce the vibration of the wire to a level below a dangerous condition.

It should be noted that one of the important features of the invention lies in the fact that in both cases the vibration dampeners are provided with a means for preventing creeping of the vibration damping material. It will be understood that most vibration damping material, because of its very nature, is somewhat subjected to creeping. That is to say, there is a tendency to remain in a condition of displacement under force rather than return to the original condition once the force has been removed. In the case of the embodiment of the invention shown in Fig. 1, this is prevented by the use of the wires 17 which are embedded in the vibration damping material. In the case of the embodiment shown in Fig. 5, the creeping is prevented by enclosing each of the elements of the vibration damping means in a groove which encloses it and prevents it from moving longitudinally of the cable.

At least part of each of the vibration dampers is on the cable under considerable pressure, which pressure is sufficient to create a permanent tension or stress in the resilient material but is less than the pressure which would cause the elastic limit of the material to be reached.

Other modes of applying the principles of the invention may be used, change being made as regards the details described, provided the features stated in the following claim or the equivalent of such be employed.

The invention having been thus described, what is claimed as new and desired to secure by Letters Patent, is:

A suspension for an electric cable, comprising a main body adapted to extend along the cable, means for suspending the main body centrally thereof, clamping means located in the central portion of the main body and making direct contact with the cable for fixing the cable against movement relative to the body, a vibration-damping means located at the ends of the main body and supported thereby, the said vibration-damping means being formed of vibration-absorbing material and having a thickness transversely of the cable which increases as a function of the distance from the said clamping means, and metallic strands embedded in the material of which the vibration-damping means is formed and extending longitudinally of the cable to prevent creeping thereof along the cable.

References Cited in the file of this patent
UNITED STATES PATENTS

| | | |
|---|---|---|
| 1,884,036 | Malone | Oct. 25, 1932 |
| 1,898,677 | Malone | Feb. 21, 1933 |
| 2,529,279 | Breisch | Nov. 7, 1950 |
| 2,866,058 | Hebenstreit | Dec. 23, 1958 |
| 2,917,264 | Hartenstein | Dec. 15, 1959 |

FOREIGN PATENTS

| | | |
|---|---|---|
| 331,220 | Italy | Oct. 31, 1935 |
| 782,902 | France | Mar. 25, 1935 |